United States Patent [19]

Park

[11] Patent Number: 5,058,130

[45] Date of Patent: Oct. 15, 1991

[54] JITTER EQUALIZER FOR DIGITAL TRANSMISSION FILTER

[75] Inventor: Il-Kun Park, Suwon, Rep. of Korea

[73] Assignee: SamSung Electronics Co., Ltd., Kyung, Rep. of Korea

[21] Appl. No.: 457,568

[22] Filed: Dec. 27, 1989

[30] Foreign Application Priority Data

Jul. 31, 1989 [KR] Rep. of Korea ............... 10868/1989

[51] Int. Cl.⁵ .............................................. H04B 3/04
[52] U.S. Cl. ...................... 375/12; 375/118; 333/28 R
[58] Field of Search .............. 375/12, 14, 118; 333/28 R

[56] References Cited

U.S. PATENT DOCUMENTS

3,758,863  9/1973  Ungerboeck .............. 333/28 R
4,650,930  3/1987  Hogeboom et al. .............. 375/14

Primary Examiner—Douglas W. Olms
Assistant Examiner—Marianne Huseman
Attorney, Agent, or Firm—Robert E. Bushnell

[57] ABSTRACT

An equalizer for equalizing an input data signal of a digital transmission filter for jitter, overshoot and undershoot in amplitude includes a delay circuit which delays an input non-return-to-zero (NRZ) data signal a specified number of bits by synchronizing the input data signal with a basic clock signal, and outputs a plurality of delayed data bit streams each corresponding to a respective delay element of the delay circuit. The delayed data bit streams are input to a logic circuit which produces a plurality of voltage control signals corresponding to patterns of logic symbols in the data bit streams of the delayed input data signal, these voltage control signals designating information as to how much the delayed input data signal will be distorted due to data signals adjacent thereto upon passing through a digital transmission filter. The voltage control signals are input to a voltage generator coupled to the output of the logic circuit, and the voltage generator, under the control of a time control signal applied thereto, outputs a given level of adding or subtracting voltage in response to these voltage control signals. The delayed input data signal is converted from a unipolar data signal to a bipolar data signal, and an adder circuit adds the given amount of adding or subtracting voltage from the voltage generator to the bipolar data signal to compensate for the amount of signal distortion which occurs in the output waveform of the digital transmission filter due to the influence on the input data signal of the pulse tails of data signals adjacent thereto when the bipolar input data signal passes through the digital transmission filter.

14 Claims, 9 Drawing Sheets

FIG. 8a
TABLE OF CORRECTION VALUES (Vx)

TABLE [1]

| SYMBOL CONSTRUCTION OF DATA | | | | | | CORRECTION VALUES (Vx) | NORMALIZED CORRECTION VALUES (Vx) | STATE OF SWITCHES | |
|---|---|---|---|---|---|---|---|---|---|
| A | B | C | D | E | F | | | $SW_{31}$ | $SW_{32}$ |
| 0 | 0 | 0 | 0 | 0 | 0 | -0.657 | -0.6 | - | ON |
| 0 | 0 | 0 | 0 | 0 | 1 | -0.6 | -0.6 | - | ON |
| 0 | 0 | 0 | 0 | 1 | 0 | -1 | 1 | - | - |
| 0 | 0 | 0 | 0 | 1 | 1 | -1 | 1 | - | - |
| 0 | 0 | 0 | 1 | 0 | 0 | 1.342 | 1.4 | - | ON |
| 0 | 0 | 0 | 1 | 0 | 1 | 1.4 | 1.4 | - | ON |
| 0 | 0 | 0 | 1 | 1 | 0 | 0.943 | 1 | - | - |
| 0 | 0 | 0 | 1 | 1 | 1 | 1 | 1 | - | - |
| 0 | 0 | 1 | 0 | 0 | 0 | 0.6 | 0.6 | - | ON |
| 0 | 0 | 1 | 0 | 0 | 1 | 0.543 | 0.6 | - | ON |
| 0 | 0 | 1 | 0 | 1 | 0 | 1.057 | 1 | - | - |
| 0 | 0 | 1 | 0 | 1 | 1 | 1 | 1 | - | - |
| 0 | 0 | 1 | 1 | 0 | 0 | -1.342 | -1.4 | - | ON |
| 0 | 0 | 1 | 1 | 0 | 1 | -1.4 | -1.4 | - | ON |
| 0 | 0 | 1 | 1 | 1 | 0 | -0.943 | -1 | - | - |
| 0 | 0 | 1 | 1 | 1 | 1 | -1 | -1 | - | - |
| 0 | 1 | 0 | 0 | 0 | 0 | -1.057 | -1 | - | - |
| 0 | 1 | 0 | 0 | 0 | 1 | -1 | -1 | - | - |
| 0 | 1 | 0 | 0 | 1 | 0 | -1.457 | -1.4 | ON | - |
| 0 | 1 | 0 | 0 | 1 | 1 | -1.4 | -1.4 | ON | - |
| 0 | 1 | 0 | 1 | 0 | 0 | 0.943 | 1 | - | - |
| 0 | 1 | 0 | 1 | 0 | 1 | 1 | 1 | - | - |
| 0 | 1 | 0 | 1 | 1 | 0 | 0.543 | 0.6 | ON | - |
| 0 | 1 | 0 | 1 | 1 | 1 | 0.6 | 0.6 | ON | - |
| 0 | 1 | 1 | 0 | 0 | 0 | 1.057 | 1 | - | - |
| 0 | 1 | 1 | 0 | 0 | 1 | 1 | 1 | - | - |
| 0 | 1 | 1 | 0 | 1 | 0 | 1.457 | 1.4 | ON | - |
| 0 | 1 | 1 | 0 | 1 | 1 | 1.4 | 1.4 | ON | - |
| 0 | 1 | 1 | 1 | 0 | 0 | -0.943 | -1 | - | - |
| 0 | 1 | 1 | 1 | 0 | 1 | -1 | -1 | - | - |
| 0 | 1 | 1 | 1 | 1 | 0 | -0.543 | -0.6 | ON | - |
| 0 | 1 | 1 | 1 | 1 | 1 | -0.6 | -0.6 | ON | - |

FIG. 8b

TABLE [1] - CONTINUED

| SYMBOL CONSTRUCTION OF DATA | | | | | | CORRECTION VALUES (Vx) | NORMALIZED CORRECTION VALUES (Vx) | STATE OF SWITCHES | |
|---|---|---|---|---|---|---|---|---|---|
| A | B | C | D | E | F | | | $SW_{31}$ | $SW_{32}$ |
| 1 | 0 | 0 | 0 | 0 | 0 | -0.6 | -0.6 | - | ON |
| 1 | 0 | 0 | 0 | 0 | 1 | -0.543 | -0.6 | - | ON |
| 1 | 0 | 0 | 0 | 1 | 0 | -1 | 1 | - | - |
| 1 | 0 | 0 | 0 | 1 | 1 | -0.943 | 1 | - | - |
| 1 | 0 | 0 | 1 | 0 | 0 | 1.4 | 1.4 | - | ON |
| 1 | 0 | 0 | 1 | 0 | 1 | 1.457 | 1.4 | - | ON |
| 1 | 0 | 0 | 1 | 1 | 0 | 1 | 1 | - | - |
| 1 | 0 | 0 | 1 | 1 | 1 | 1.057 | 1 | - | - |
| 1 | 0 | 1 | 0 | 0 | 0 | 0.6 | 0.6 | - | ON |
| 1 | 0 | 1 | 0 | 0 | 1 | 0.543 | 0.6 | - | ON |
| 1 | 0 | 1 | 0 | 1 | 0 | 1 | 1 | - | - |
| 1 | 0 | 1 | 0 | 1 | 1 | 0.943 | 1 | - | - |
| 1 | 0 | 1 | 1 | 0 | 0 | -1.4 | -1.4 | - | ON |
| 1 | 0 | 1 | 1 | 0 | 1 | -1.457 | -1.4 | - | ON |
| 1 | 0 | 1 | 1 | 1 | 0 | -1 | -1 | - | - |
| 1 | 0 | 1 | 1 | 1 | 1 | -1.057 | -1 | - | - |
| 1 | 1 | 0 | 0 | 0 | 0 | -1 | -1 | - | - |
| 1 | 1 | 0 | 0 | 0 | 1 | -0.943 | -1 | - | - |
| 1 | 1 | 0 | 0 | 1 | 0 | -1.4 | -1.4 | ON | - |
| 1 | 1 | 0 | 0 | 1 | 1 | -1.343 | -1.4 | ON | - |
| 1 | 1 | 0 | 1 | 0 | 0 | 1 | 1 | - | - |
| 1 | 1 | 0 | 1 | 0 | 1 | 1.057 | 1 | - | - |
| 1 | 1 | 0 | 1 | 1 | 0 | 0.6 | 0.6 | ON | - |
| 1 | 1 | 0 | 1 | 1 | 1 | 0.657 | 0.6 | ON | - |
| 1 | 1 | 1 | 0 | 0 | 0 | 1 | 1 | - | - |
| 1 | 1 | 1 | 0 | 0 | 1 | 0.943 | 1 | - | - |
| 1 | 1 | 1 | 0 | 1 | 0 | 1.4 | 1.4 | ON | - |
| 1 | 1 | 1 | 0 | 1 | 1 | 1.343 | 1.4 | ON | - |
| 1 | 1 | 1 | 1 | 0 | 0 | -1 | -1 | - | - |
| 1 | 1 | 1 | 1 | 0 | 1 | -1.057 | -1 | - | - |
| 1 | 1 | 1 | 1 | 1 | 0 | -0.6 | -0.6 | ON | - |
| 1 | 1 | 1 | 1 | 1 | 1 | -0.657 | -0.6 | ON | - |

JITTER EQUALIZER FOR DIGITAL TRANSMISSION FILTER

BACKGROUND OF THE INVENTION

1. Field of the Invention

The present invention relates to a jitter equalizer for a digital transmission filter limiting an occupied frequency bandwidth of a transmission signal to achieve the most efficient use of frequency in the digital transmission. In particular, the invention is concerned with a digital technique for achieving minimal occurrence of jitter, overshoot and undershoot in an output waveform in the filter for digital transmission.

2. General Description of Prior Arts

In filtering a digital transmission signal by a known digital filter, even if its group delay characteristic is compensated almost completely, tails of adjacent pulse outputs before and after an object pulse output frequently lead to distortion of the object pulse output. This distortion causes uneven zero-crossing of the output pulse waveforms and inevitably results in phase vibration error, that is, jitter. The overshoot and undershoot of output pulse waveforms in the filter are made due to the tails of the adjacent pulses when a sequence of pulses with the same logic level are provided.

Generally, in a digital transmission system, it is impractical from the view point of efficient frequency usage, to transmit an original digital pulse with comparatively broad bandwidth, without any modification or alternation thereto. Thus, so long as it has no significant effect on digital signals to be transmitted, the transmission should be preferably carried out with minimal bandwidth limitation. This will be effectively achieved by a filter limiting the bandwidth of transmission signals to a specified bandwidth, so that a most numerous, plurality of channels can be transmitted within a frequency range of the specified bandwidth, and the largest amount of information can be transmitted without occurrence of interference between each of the adjacent channels.

Filtering of the transmission signals is generally achieved by two known arts. One is to use a filter for bandwidth limitation at a final output stage after modulation of digital information. The other is to carry out modulation of a carrier signal after prefiltering of input digital pulses. The former system requires a filter having a very narrow bandwidth at a high frequency, which is considerably difficult to construct. Thus the latter system has been mainly used in current digital transmission (see U.S. Pat. No. 4,644,565 of Jongsoo Seo). In the present invention, therefore, an equalizer for filters according to the latter system will be specifically described hereinafter.

During filtering of a signal waveform in a filter, the phase delay characteristic within a passband changes non-linearly with its frequency variance. Therefore, most filters in digital transmission systems have therein a group delay equalizer to compensate non-linearity of phase delay according to a frequency band of the filter, so as to prevent distortion of information resulting from inter-symbol interference of transmission signals.

Figure 1A:
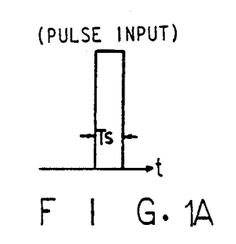
FIG. 1A shows a pulse input to be applied to a filter, having a given period (Ts)
Figure 1B:
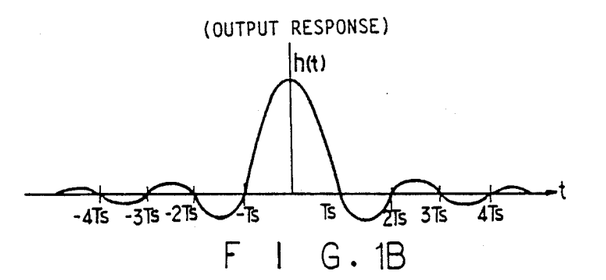
FIG. 1B shows an output response in the filter to the pulse input of FIG. 1A.
Figure 1C:
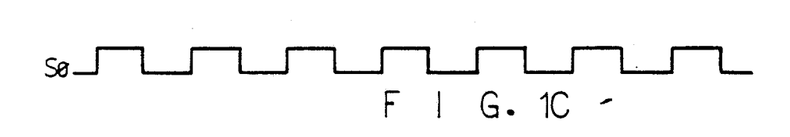
FIG. 1C shows a basic clock signal ($S_0$)
Figure 1D:
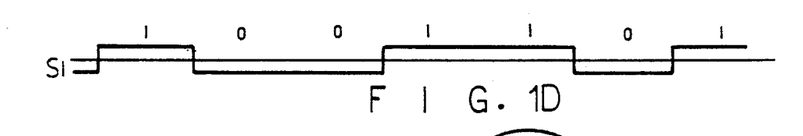
FIG. 1D shows an example of a random NRZ digital data signal ($S_1$) synchronized with the basic clock signal ($S_0$), to be applied to the filter.
Figure 1E:
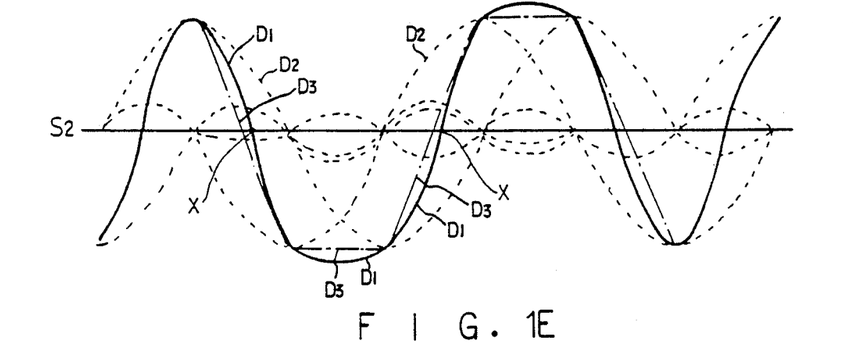
FIG. 1E shows various output waveforms ($S_2$) of the filter to the applied NRZ digital data signal ($S_1$)

However, even if the filter is one completely compensated in its group delay as above described, referring to FIGS. 1A and 1B, wherein the transfer characteristic on a pulse waveform of period (Ts) in the filter is shown, a main lobe of the output response is two times as wide as the period (Ts), and some tail components thereof are left. These tail components affect adjacent pulses such as preceding pulses or following pulses of the original pulse. FIGS. 1C and 1D respectively show waveforms of a base clock signal $S_0$ and a random Non-return to Zero (NRZ) digital data pulse signal $S_1$ synchronized with the base clock $S_0$. FIG. 1E shows output response to input of the random NRZ digital data pulse signal $S_1$ in the filter, wherein a waveform $D_3$ corresponds to an ideal output response. However, owing to the above described transfer characteristic leaving such tail components in the filter, various pulse responses including tail components such as dotted curves $D_2$ in FIG. 1E are subtracted and added in amplitude to each other to produce an undesirable output waveform. Accordingly, this causes the distortion of output response in the filter, as shown by the waveform $D_1$, and as a result, the zero-crossing points(X) in the output waveform become uneven.

Figure 2A:
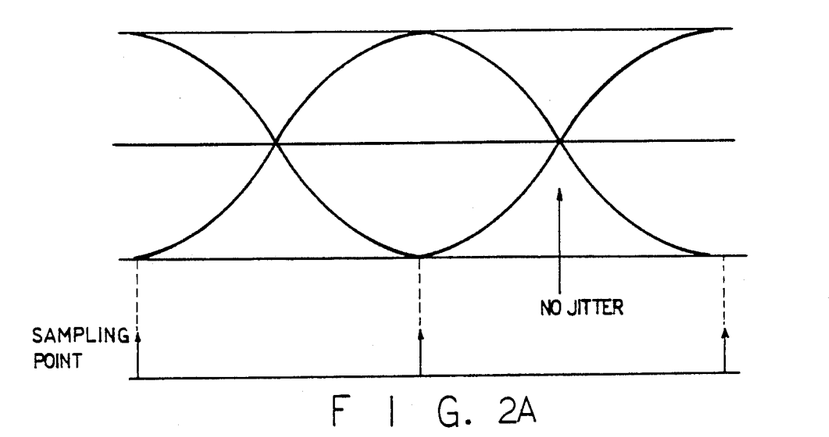
FIG. 2A shows of an ideal eye-diagram an oscilloscope corresponding to the ideal output waveform ($D_3$) from the filter.
Figure 2B:
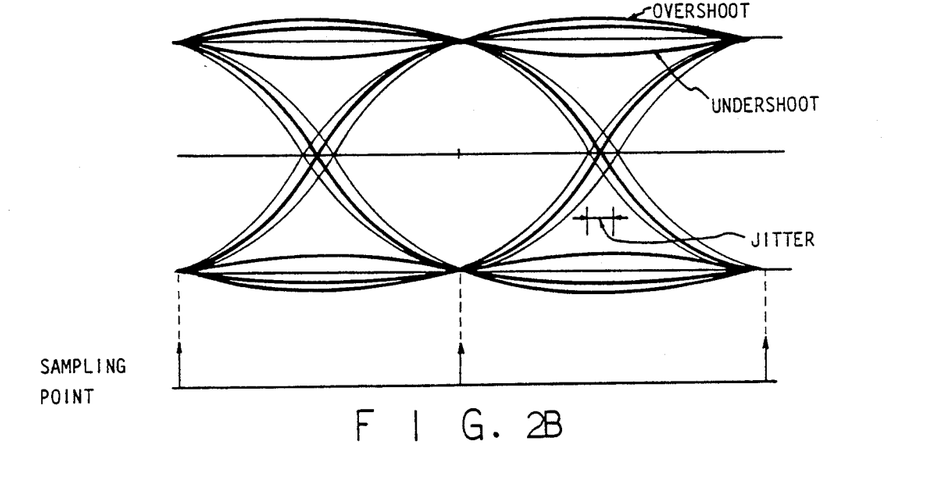
FIG. 2B shows of an actual eye-diagram on oscilloscope, having some jitter, since the output waveform includes tails from the filter.

FIG. 2A shows an ideal eye-diagram observed on an oscilloscope when the above output waveform of the filter is synchronized with a time axis of the oscilloscope by the base clock $S_0$ of FIG. 1C. The ideal eye-diagram shows no distortion. However, FIG. 2B shows an actual eye-diagram observed on the oscilloscope, wherein a plurality of overlapping waveforms in overshoot or undershoot show up owing to the above described tail components. This fluctuation of the zero-crossing timing is referred to as jitter distortion. Further, the tail components lead to the overshoot and undershoot in amplitude as seen in FIG. 2B. The larger the amount of the bandwidth limitation in a filter, the larger these jitter distortion, overshoot and undershoot phenomena become.

When a symbol timing recovery operation extracting a clock synchronized in phase with that of the transmission end is carried out to make precise the demodulation of data at a receiving end, the jitter distortion severely affects the reproduction. In the clock recovery operation, as the phase of the transmission signal is estimated, in most cases, on the basis of zero-crossing time of the received signal, the fluctuation of zero-crossing timing from the transmitting end of the transmission signal makes unstable the phase of the reproduced clock, which inevitably leads to decreased error performance of the receiver. To overcome this problem in a conventional system, a phase locked loop has been used in a receiver to compensate the jitter distortion, the phase locked loop being comparatively less sensitive to the jitter fluctuation in transmission. However, since, the coverage of such compensation by the phase lock loop requires very narrow loop bandwidth characteristics and hardware implementation is very difficult, the above mentioned problem remains still unresolved in the digital transmission system with bandwidth limitation.

The aforementioned overshoot and undershoot phenomena in amplitude is mostly applied to a power amplifier of a transmitter and leads to saturation of the power amplifier, which results in an increase of unnecessary bands in transmission.

U.S. Pat. No. 4,339,724 to Feher discloses a non-linear filter for minimizing such jitter distortion, overshoot and undershoot phenomena in amplitude as described above. However, this has still a drawback in that its bandwidth limitation is carried out in a relatively small range and further, is not variable over the specified small data rate range.

SUMMARY OF THE INVENTION

An object of the present invention is, therefore, to provide a jitter equalizer and an equalizing method of a filter for digital transmission, capable of reducing occurrence of the phase jitter error, and the overshoot and undershoot phenomena in the filter for bandwidth limitation of digital transmission signals, the jitter equalizer being disposed before the filter.

Another object of the present invention is to provide a jitter equalized filter and an equalizing method of a filter for digital transmission, capable of performing a positive jitter equalization without any modification to its circuit, irrespective of the wide range of band frequency or bit-rate in the filter.

Still another object of the invention is to provide a jitter filter and an equalizing method of a filter for digital transmission, capable of equalizing the jitter overshoot and undershoot phenomena in amplitude with simple modification from its original circuit construction, independently of variation of band frequency limitation in the filter.

According to one aspect of the invention, a jitter equalizer according to the present invention includes: delaying means having a plurality of delay elements, for producing a delayed input data delayed by a specified number of bits by synchronizing a random NRZ input data with a basic clock signal, and for outputting a plurality of a bits of data stream respectively corresponding to each one of said plurality of delay elements; logic means for producing a plurality of voltage control signals corresponding to a pattern of logic symbols of said input data from said plurality of bits of said data stream, said plurality of voltage control signals designating information as to how much said delayed input data will be distorted by adjacent data thereof; means for generating an adding or subtracting voltage, coupled to an output of said logic means, for outputting a given level of adding or subtracting voltage in response to said plurality of voltage control signals from said logic means, under the control of a time control signal; bipolar converting means, coupled to said delaying means, for converting said delayed input data from an unipolar data to a bipolar data; and mixing means for adding said bipolar input data to said given level of adding or subtracting voltage, the added output of said mixing means compensating an amount of signal distortion due to influence of tails of said adjacent data of the output pulse waveform when said bipolar input data passes through said filter.

Another aspect of the present invention, an equalizing method of a filter for digital transmission, includes the steps of making a pre-estimate as to the extent of signal distortion caused by the sum of the tails in output pulse waveforms of adjacent data of an input data signal during passage through said filter of said input data signal, according to a logic state of said adjacent data; on the basis of said pre-estimate, equalizing said input data signal, prior to passing through said filter, with a higher amplitude of an output square wave than a mean level of said sum of said tails, when said sum of said tails increases in a negative direction; and on the basis of said pre-estimate, equalizing said input data signal, prior to passing through said filter, with a lower amplitude of an output square wave than the mean level of said sum of said tails, when said sum of said tails increases in a positive direction.

BRIEF DESCRIPTION OF THE DRAWINGS

A better understanding of the invention may be obtained by reference to the detailed description below, and to the following drawings, wherein:

FIGS. 5A to 5D respectively show an output response characteristic to various input pulses, wherein FIG. 5A shows an impulse characteristic of a Nyquist filter, FIG. 5B an adding pulse $d_1(t)$, FIG. 5C a subtracting pulse $d_2(t)$, FIG. 5D a pulse $S_1(t)$ modified by adding, and FIG. 5E a pulse $S_2(t)$ modified by subtracting;

DETAILED DESCRIPTION OF THE INVENTION

Figure 3:
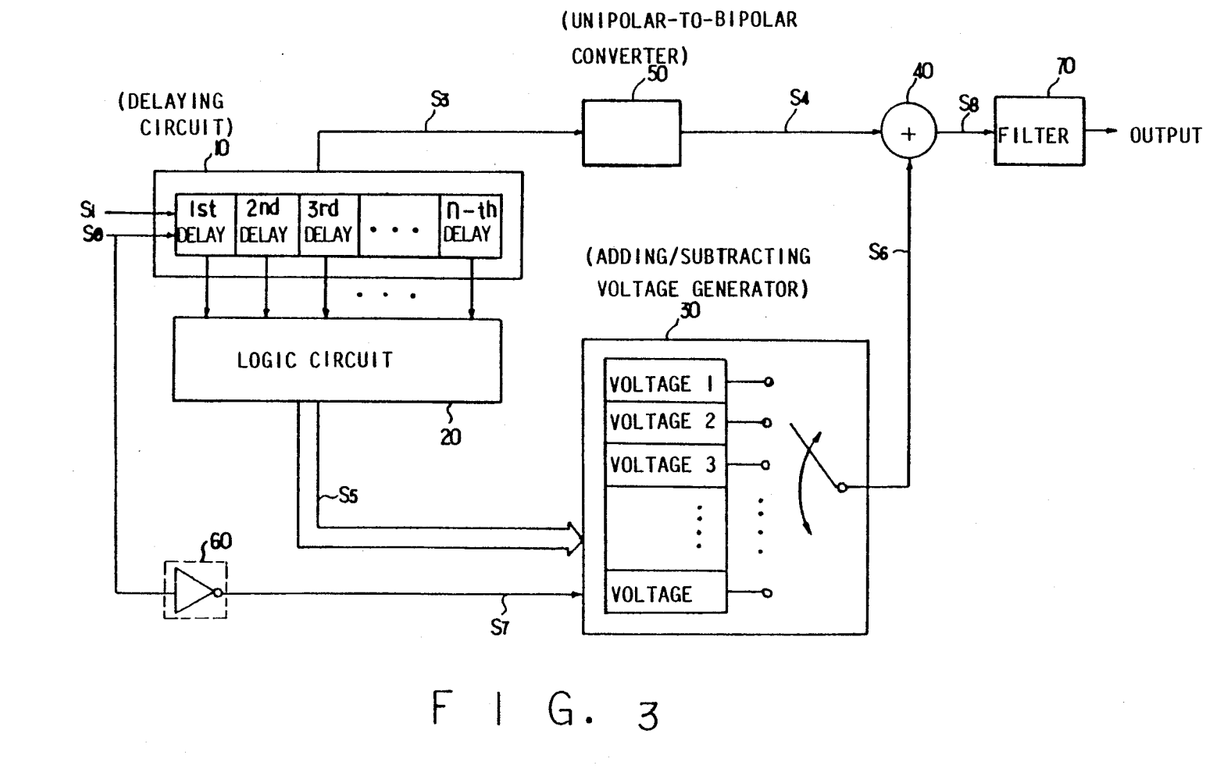
FIG. 3 is a block diagram according to the invention.

Referring to FIG. 3, of a block diagram a jitter equalizer according to the invention is shown. A delaying circuit 10 has a plurality of delay elements (first, second, third ... n-th delay). A random NRZ digital data signal $S_1$ inputted into the delaying circuit is synchronized with a basic clock signal $S_0$ and delayed therein by a given number, of bits to produce an object data signal $S_3$. This delayed data signal is supplied to a logic circuit 20 to obtain information as to a construction pattern of the data stream. The logic circuit 20 receives the delayed digital data from the delaying circuit 10, and by analyzing a construction pattern of logic symbols of the data stream received, makes a pre-estimate as to how the object data signal $S_3$ will be distorted by its adjacent data. The pre-estimate is referred to as a control signal $S_5$, hereinafter. An adding and subtracting voltage generator 30 is connected to the logic circuit 20 to receive the control signal $S_5$ therefrom, and generates an adding/subtracting voltage during a given time duration on the basis of a time control signal $S_7$ from an inverter 60. An unipolar-to-bipolar converter 50 is coupled to the delaying circuit 10, to convert the object unipolar data signal $S_3$ into a bipolar data signal $S_4$ for filtering and digital modulation in a following stage. An adder 40 receives both the output of the unipolar-to-bipolar converter 50 and the output of the adding/subtracting voltage generator 30. To make pre-compensation for the effect of any possible distortion caused by tails of the adjacent pulse outputs when the bipolar data signal S₄ passes through a filter 70, the adder 40 gives modification to amplitude of the bipolar data signal S₄ by receiving the output of the adding/subtracting voltage, that is, a voltage S₆. By this, an equalized output signal S₈ from the adder 40 is applied to the filter 70. An inverter is connected between the input terminal of the base clock signal S₀ and the adding/subtracting voltage generator 30, to provide the time control signal S₇, which is an inverted base clock signal, so that the modification of the bipolar data signal S₄ is carried out during a second half period of the clock signal.

FIGS. 4A through 4E each illustrate various waveforms according to each embodiment of a data pattern, for easy explanation of occurrence of the jitter, and the overshoot and undershoot in amplitude in accordance with the construction pattern of data symbols.

Figure 4A:
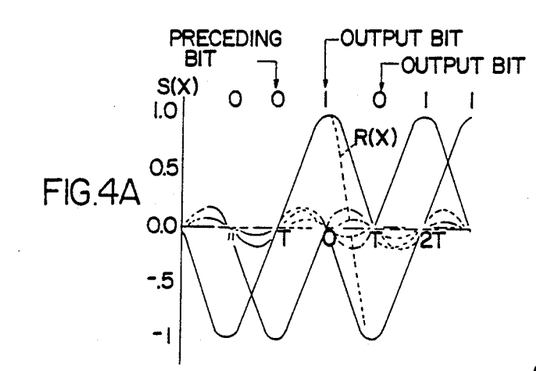
FIGS. 4A to 4E respectively show various waveforms for explaining occurrence of jitter, overshoot and undershoot phenomena in amplitude according to combinations of data symbols, each illustrating an example of a data pattern in transmission.

A waveform $R(x)$ of FIG. 4A shows a case where there is no effect on the object output pulse waveform as a sum of tail components of the adjacent pulses becomes zero due to the construction pattern of data symbols.

Figure 4B:
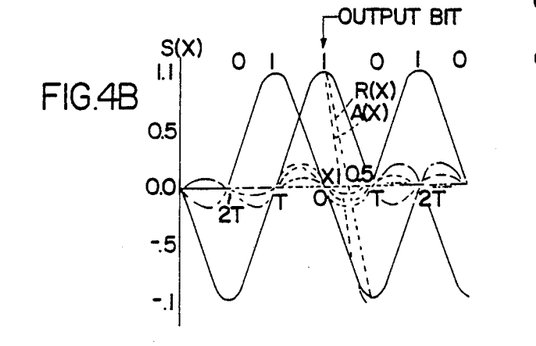

A waveform $A(x)$ of FIG. 4B shows a case where the output pulse waveform inclines a little more to the inner side than a position of a usual one owing to distortion, as a sum of the tail components becomes high toward a negative direction.

Figure 4C:
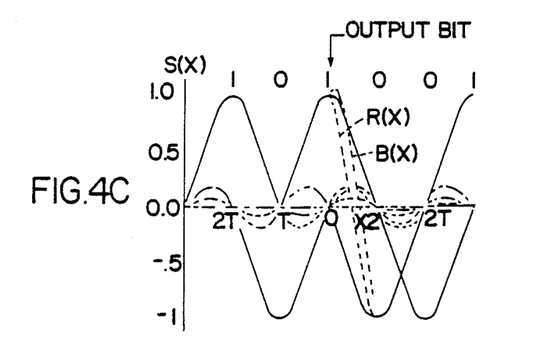

A waveform $B(x)$ of FIG. 4C shows a case where the output pulse waveform inclines a little more to the outer side than the position of a usual one owing to distortion, as a sum of the tail components becomes high toward a positive direction.

Figure 4D:
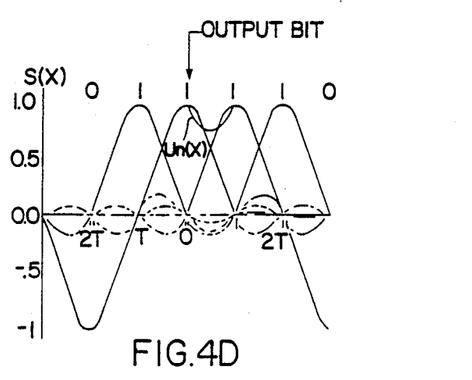

A waveform $Un(x)$ of FIG. 4D shows a case where the output pulse waveform is disposed a little more toward the lower direction than the position of a usual one owing to distortion, as a sum of the tail components becomes high toward a negative direction when two symbols are the same as each other.

Figure 4E:
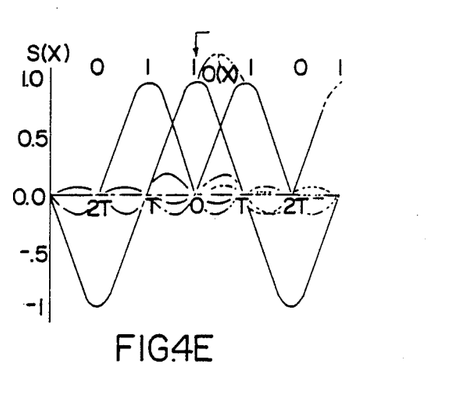

A waveform $O(x)$ of FIG. 4E shows a case where the output pulse waveform is disposed a little more toward the upper direction than the position of the usual one, as a sum of the tail components goes high toward a positive direction when two symbols are the same as each other.

When a symbol of input data is logically 1 or −1, an output of the filter is formed from superposing, a second half period of an output pulse waveform of an object signal data with a first half period of the output pulse waveform of a following data signal, in a single period, in which a period of the object data signal increases to a double period compared to its input signal owing to the transfer characteristic of the filter, as shown in FIGS. 4A to 4E. This output of the filter is expressed in following formula (1).

$$U(x) = \text{[sum of adjacent output pulse waveforms]} + \text{[sum of all tails of preceding output pulse waveform and following output pulse waveform in object output pulse area]}$$

$$= b_0 S(x) + b_{-1} S(x) + \sum_{k=1}^{n} [b_{1+k} \cdot S(x+1+k) + b_{-2+k} \cdot (x-2-k)] \quad (1)$$

wherein, $0 < X < 1$.

Here, if the filter is a raised cosine filter satisfying a Nyquist condition, the impulse response $S(x)$ is expressed in the following formula (2).

$$S(x) = 0, (x = \pm k, k = 1, 2, 3, \ldots, n) \quad (2)$$
$$= \frac{\sin \pi x}{\pi x} \cdot \frac{\cos \alpha \pi x}{1 - 4\alpha^2 x^2}$$

Here, the factor $\alpha$ is a roll-off factor expressing the excess rate of an ideal Nyquist's minimum bandwidth limitation in the filter, and $b_k$ means a symbol of (k)-th bit, that is logically normalized to 1 or −1.

As shown in FIGS. 4A to 4E and the above formula (1), the sum of unnecessary tail components generated due to adjacent pulses and thereafter inserted into the object output waveform, causes variation of its zero crossing timing points, and further the overshoot and undershoot phenomena in amplitude. Thus, a jitter equalizer according to the invention applies to the filter the input data delayed by a given number of bits, and by analyzing the input data pattern around the object data, makes a pre-estimate as to how much the tails of adjacent output pulse waveforms affect the amplitude of the object output pulse waveform through the filter. The jitter equalizer of the invention is designed to also eliminate the jitter distortion and the overshoot and undershoot phenomena in amplitude, by means of applying to the filter a compensation value opposite to the pre-estimated one modifying the amplitude of the object output pulse.

Figure 5:
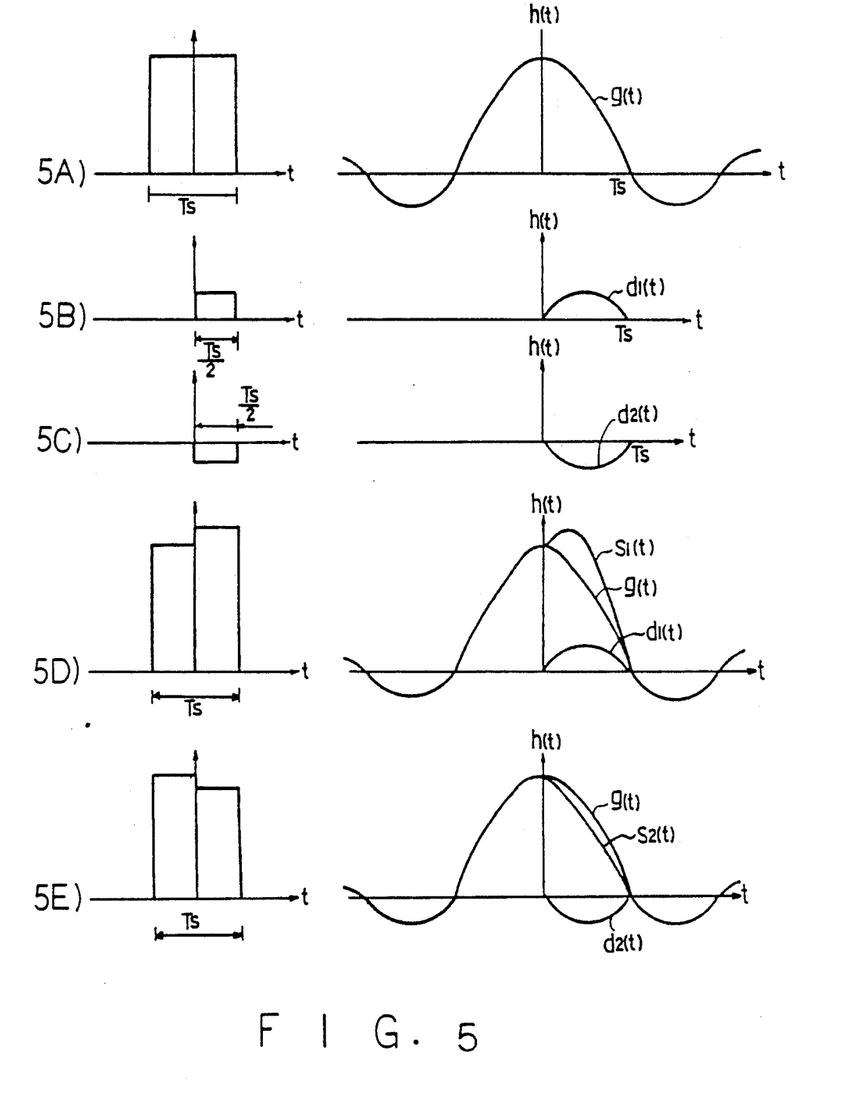

For example, due to the effect of adjacent pulse tails in a normal filter output $g(t)$ shown in FIG. 5A, if a zero-crossing point of the object output waveform formed by adding it with a following bit is at a little distance inward from its normal position, then an adding pulse $d_1(t)$ of FIG. 5B is added to the object data square waveform to produce a modified square wave of FIG. 5D. The adding pulse $d_1(t)$ corresponds to a reciprocal number to an estimated value of decrement. The modified square wave is applied to the filter to make addition $g(t)$ and $d_1(t)$, thereby producing an asymmetrical waveform such as $S_1(t)$. Thus, a correct zero-crossing of the output waveform is made even under influence of the tails of adjacent pulse waveforms. This will achieve the equalization according to the invention.

If the zero-crossing point of the object output waveform formed by adding it with a following bit is at a slight outer distance from the normal position, then a subtracting pulse $d_2(t)$ of FIG. 5C is added to (i.e. subtracted from) the object data square waveform to produce a modified square wave of FIG. 5E. The subtracting pulse $d_2(t)$ corresponds to a reciprocal value to an estimated value of increment. This modified square wave is applied to the filter to make addition of $g(t)$ and $d_2(t)$, thereby producing an asymmetrical waveform such as $S_2(t)$. Thus, a correct zero-crossing of the output waveform is made even under influence of the tails of adjacent pulse waveforms.

Now, the operation of the jitter equalizer according to the invention will be explained in the detail with reference to the aforementioned description and drawings. The digital data signal $S_1$ and the basic clock signal $S_0$ are respectively applied into the delaying circuit 10. The clock signal $S_0$ is used as a base clock for delaying operation and also applied to an inverter 60 to produce a time control signal $S_7$. The delaying circuit 10 synchronizes the digital data signal $S_1$ with the clock signal $S_0$ to then make delay by a given number of bits, and produces an object data signal $S_3$ as an output at a specified center element in the delaying circuit. Hence the object data signal $S_3$ is a signal delayed by a plurality of clock periods from the random digital data signal $S_1$. The reason why this delay is made in the delaying circuit 10, is to obtain information as to the construction pattern of adjacent data symbols before and after the object data signal $S_3$. The greater the number of the delay elements, the more clearly the effect of the adjacent data can be evaluated. The large number of delay elements will improve performance of the equalization according to the invention. Tails of pulses will abruptly decrease as the time elapses. Thus, as the influence by data pulses at a position distant from the object data bit is negligibly small, only a definite number of delay elements need be used for the purpose of easy understanding. All the data delayed by circuit 10 is applied to the logic circuit 20 including at least a plurality of logic gates.

The logic circuit 20 receives an n number of digital data streams delayed from the respective delay elements and therefrom makes an estimate as to how much the object data signal $S_3$ will be distorted through the filter 70.

From the above formula (1), if a value x is obtained when $U(x)=0$, then it is just a zero-crossing value with distortion, wherein a condition that the value x is 0.5 means no distortion, while another condition that the value x is more than 0.5 means to pass the zero-crossing point toward an outer distant direction from the normal one, and the other condition that the value x is less than 0.5 means to pass the zero-crossing point toward an inner distant direction from the normal one.

If the value x is more than 0 or less than 1.0, then it means a case where a symbol of data signal $S_3$ and a symbol of the next data signal are the same as each other, that is, 1 and 1, or $-1$ and $-1$. In this case, a value $U(x)$ is obtained when $x=0.5$, and then, a case where its absolute value is more than 1.0, causes the overshoot output in amplitude, while a case where its absolute value is less than 1.0, causes the undershoot output in amplitude.

An equalizing voltage value Vx to be compensated from the above information can be obtained by the following formula.

$$V = \frac{b_{-1} \cdot S(x-1) + \sum_{k=1}^{n} \{b_{1+k} \cdot S(x+1+k) + b_{-2-k} \cdot S(x-2-k)\}}{b_1 S(x)} \quad (3)$$

Wherein the numeral n is a number of delay elements.

If the value Vx is 1.0 or $-1.0$, then it designates a case that no influence is made since tails affecting the object data signal are offset to each other.

If the value Vx is more than 1.0, then it designates a case that the object output waveform is moved toward the inner position from a reference point X due to the influence of tails. Thus, an amplitude of the output pulse is raised by a surplus voltage value exceeding the value 1.0, which achieves equalization to a normal zero-crossing position, for distortion during passage through the filter.

In the meanwhile, if the value Vx is less than 1.0 and more than zero, then it designates a case that the output waveform is moved toward the outer position from the reference point X due to the influence of tails. Thus, an amplitude of the output pulse is attenuated by a difference voltage value from the value 1.0, which also achieves the equalization to a normal zero-crossing point, for distortion during passage through the filter.

If the value Vx is less than $-1.0$, then it designates a case that the object output waveform is overshooting in amplitude over a reference one due to the influence of tails. Thus, an amplitude of the output pulse is attenuated by a surplus voltage value exceeding the value 1.0, which achieves the equalization through the filter.

In addition, if the value Vx is more than $-1.0$ and less than zero, then it designates a case that the object output waveform is undershooting in amplitude below the reference one due to the influence of tails. Thus, an amplitude of the output pulse is raised by a difference voltage value from the value 1.0. This also achieves the equalization for distortion through the filter.

The adding/subtracting voltage generator 30 has a given number m of voltage sources different to each other, to therefrom provide a single correction adding-/subtracting voltage $S_6$ in response to a control signal $S_5$ that corresponds to digital information generated in the logic circuit 20. The adding/subtracting voltage $S_6$ is applied to the adder 40 only during a time duration that the time control signal $S_7$ is at logic high state, that is, a second half period of the clock signal $S_0$. The reason why the above time control should be done is that the object data signal $S_3$ comes to have a period double that of its original one when passing the filter, and that the object output waveform is formed from superposition of a second half of a data output waveform and a first half of its following data output waveform. Furthermore, it is because a portion having the influence of tails of the adjacent data output waveforms is mainly in a second half period of the data.

The object data signal $S_3$ delayed by a given number of bits is converted from unipolar data to bipolar data for digital transmission in the converter 50 and then applied to the adder 40. The bipolar data signal $S_4$ of the adder is modified according to a level of the adding-/subtracting voltage $S_6$ from the voltage generator 30, to produce a modified pulse signal $S_8$ such as in FIGS. 5D and 5E. The extent of adding/subtracting voltage is generated from the adding/subtracting voltage generator 30, on the basis of the information obtained in the logic circuit 20 according to a construction pattern of the input digital data.

By the above described operation, the object data signal $S_3$ is modified to a conditional asymmetric square wave according to the symbol pattern of its adjacent data and thereafter passed through the filter 70. Therefore, a jitter equalization to a normal waveform such as in FIG. 2A, FIG. 4A and a waveform D3 of FIG. 1E, is carried out in accordance with the invention.

Figure 6:
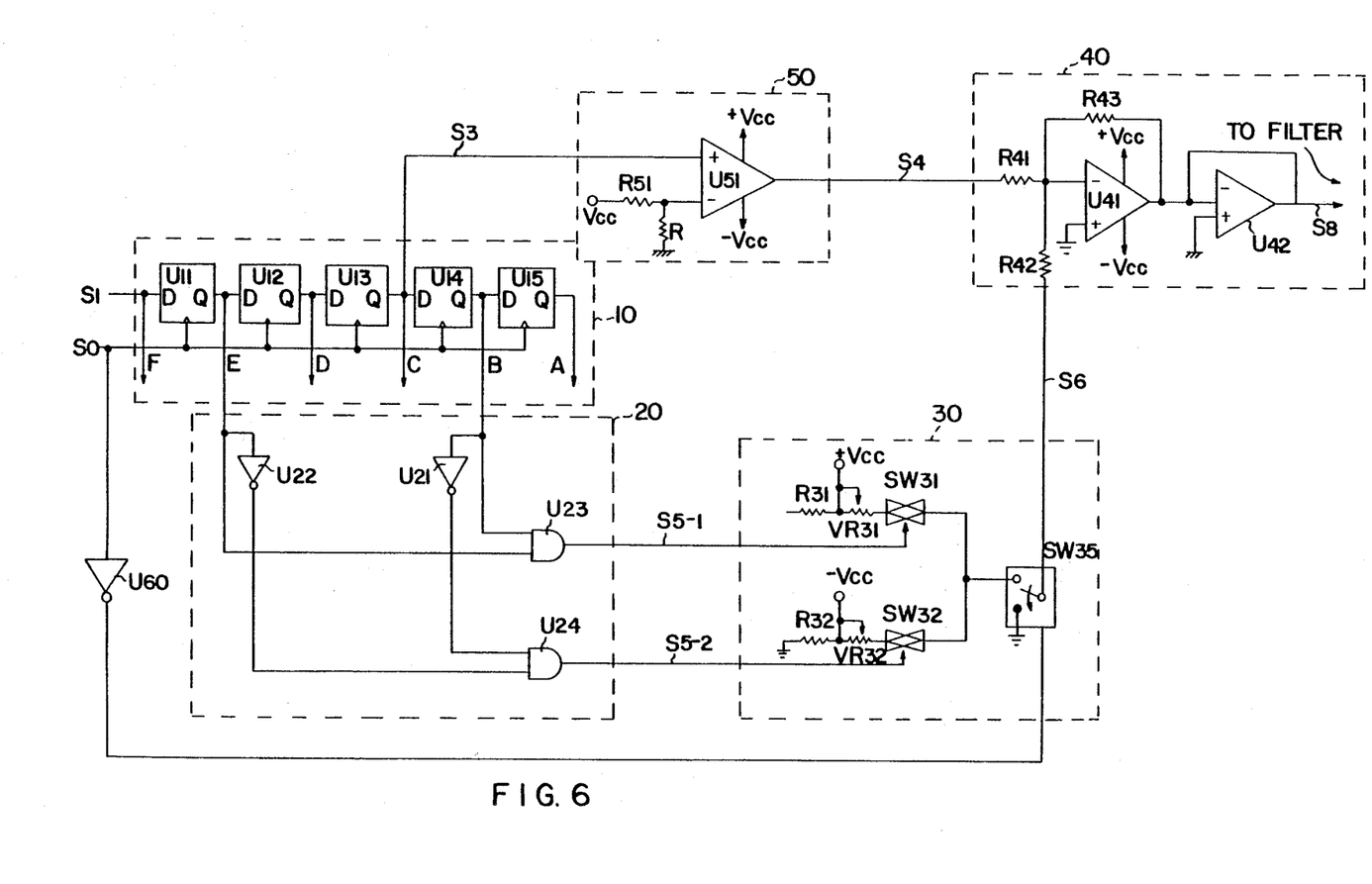
FIG. 6 shows an example of an embodiment circuit diagram of the jitter equalizer according to the invention.

Hereinafter, with reference to FIG. 6, the preferred embodiment of the jitter equalizer according to the invention will be described with reference to FIG. 7 waveforms showing every aspect of operation therein.

The delaying circuit 10 includes five D flip-flops ($U_{11}$–$U_{15}$) in cascade connection. The received digital data signal $S_1$ is delayed by six bits, wherein each delayed output is referred to as A, B, C, D, E and F in order of delayed stage, and then each delayed output is applied to the logic circuit 20. The delayed output C of a third D flip-flop $U_{13}$, that is, an object data signal $S_3$, is applied to the unipolar-bipolar converter 50.

The logic circuit includes, for example, at least two inverters ($U_{21}$, $U_{22}$) connected with each output of a first and a fourth D flip-flops ($U_{11}$, $U_{14}$), and a least two AND gates ($U_{23}$, $U_{24}$) connected to each output of the inverters ($U_{21}$, $U_{22}$). Thus, the AND gates respectively produce a control signal ($S_{5-1}$, $S_{5-2}$) for adding/subtracting voltage in the voltage generator 30. For the purpose of easy explanation of the circuit, of will be shown the case where only two control signals are generated for the adding/subtracting voltage generator. However, any modification according to increase of the number of the control signals will be possible for an ordinary person in the art. For example, logic circuit 20 can be replaced with a ROM based look-up table, and adding-/subtracting voltage generator 30 can be replaced with a D/A converter.

Figure 8A:
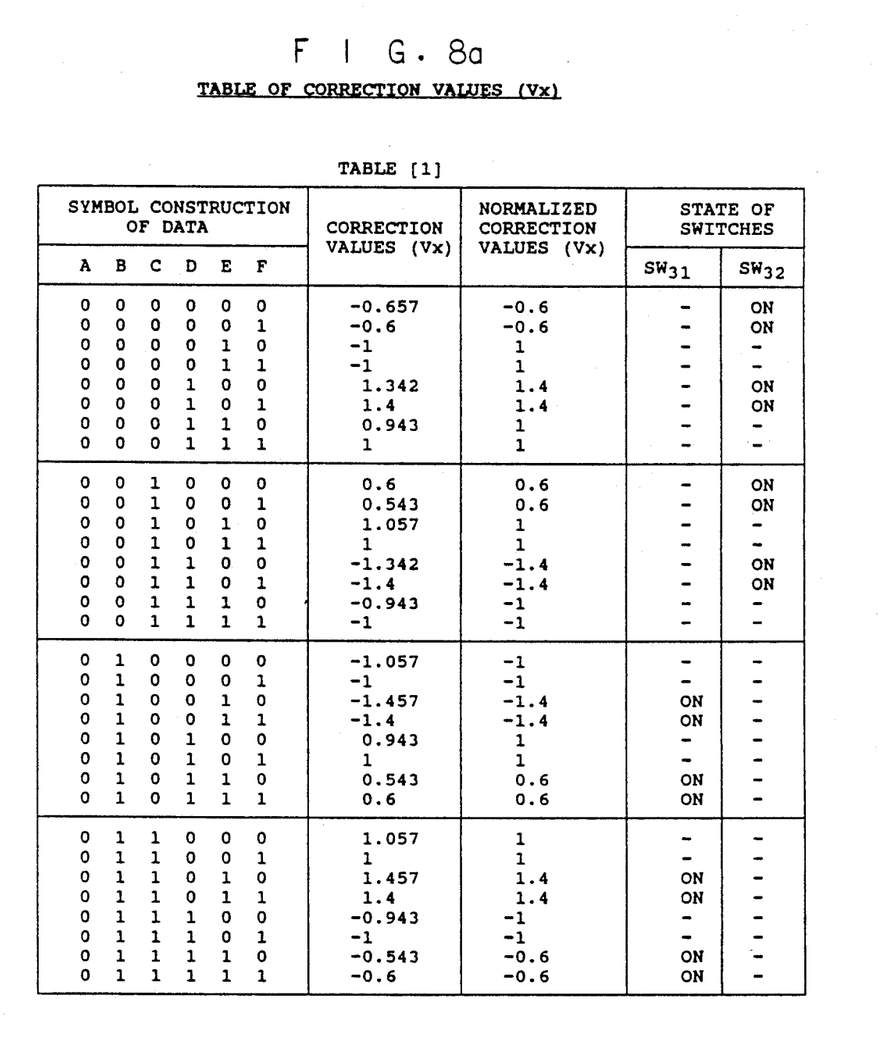
FIG. 8 shows a table of correction values Vx corresponding to each data construction in FIG. 6.
Figure 8B:
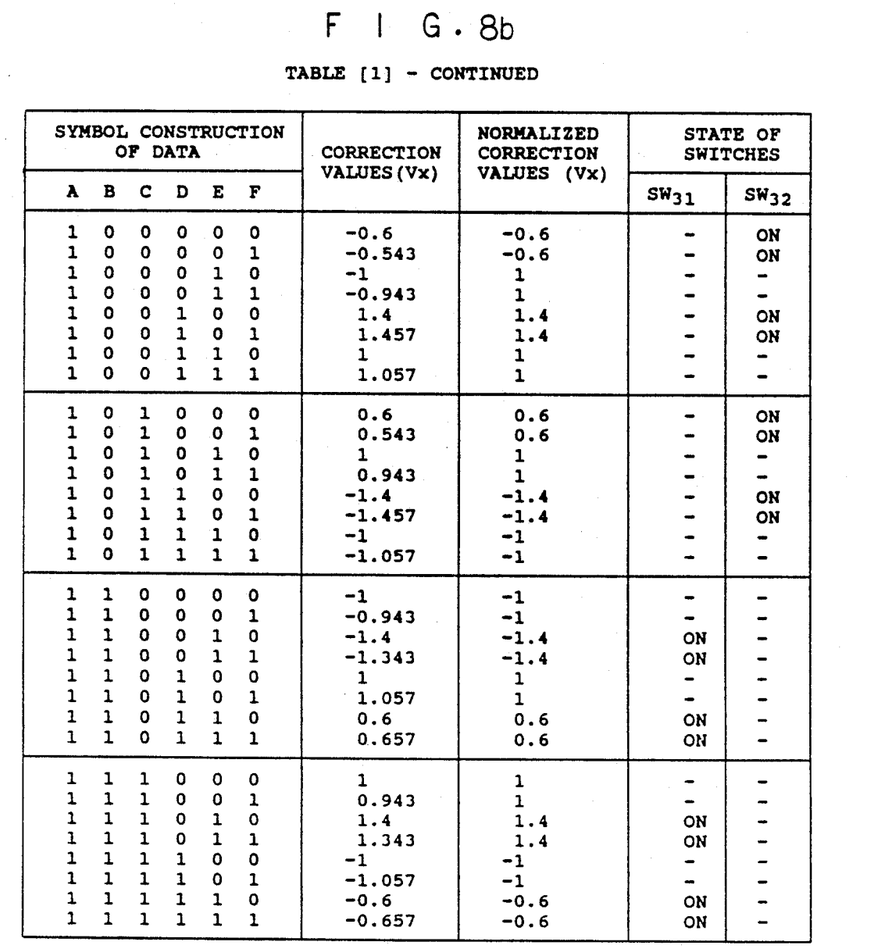

A function of the logic circuit 20 is to obtain information as to how much an object data input will be affected by jitter distortion according to the symbol pattern of adjacent data. By the formula (3), there are evaluated various correction values Vx of the attached table [1], in accordance with each data pattern of sixty-four occasions that can be made from the six data logic symbols such as A, B, C, D, E and F applied by the delaying circuit 10.

The table [1] of FIG. 8 is provided with various evaluated correction values Vx, but for the purpose of simple circuit construction, there are used a plurality of normalized correction values Vy with given values such as 1.4, 0.6, −1.4 and −0.6, in the embodiment circuit. However, these normalized correction values will not completely eliminate the jitter distortion, and the overshoot and undershoot phenomena in amplitude, but just minimize them. In general, a digital to analog converter would be good to make complete compensation thereof.

When assuming the output $S_{5-1}$ of the AND gate $U_{23}$ as a first control signal for adding voltage, and assuming the output $S_{5-2}$ of the AND gate $U_{24}$ as a second control signal for subtracting voltage, the following description will be made.

When the normalized correction value Vy is 1.4, it designates a case that the output waveform is located toward a slight inner position from an ideal one due to distortion. Thus, a second half period of the object data square wave is equalized by a multiple of 1.4 to a mean level.

When the normalized correction value Vy is 0.6, it designates a case that the output waveform is located toward a slight outer position from an ideal one due to distortion. Thus, a second half period of the object data square wave is equalized by a multiple of 0.6 to a mean level.

When the correction value Vy is −1.4, it designates that the overshoot of amplitude in the output waveform shows up due to distortion. Thus, a second half period of the object data square wave is equalized by a multiple of 0.6 to a mean level.

When the correction value Vy is −0.6, it designates a case that the undershoot of amplitude in the output waveform is shows up due to distortion. Thus, a second half period of the object data square wave is equalized by a multiple of 1.4 to a mean level.

The adding/subtracting voltage generator 30 has two analog switches ($SW_{31}$, $SW_{32}$) each connected with the output of the AND gates ($U_{23}$, $U_{24}$), two resistors ($R_{31}$, $R_{32}$) each connected between power supply voltages (+Vcc, −Vcc) and a ground potential, two variable resistors ($VR_{31}$, $VR_{32}$) each connected between the resistors and the analog switches, and a two-pole switch $SW_{33}$ connected to the analog switches.

As an adding voltage from the voltage generator 30, a voltage of 0.4-multiple amount to a mean level is made by a combination of the resistor $R_{31}$ and the variable resistor $VR_{31}$, and it is applied to the two-pole switch $SW_{33}$ through the analog switch $SW_{31}$. When the first control signal $S_{5-1}$ is logic high level, the analog switch $SW_{31}$ turns on to provide the adder 40 with the adding voltage, through the switch $SW_{33}$. In the meanwhile, as a subtracting voltage from the voltage generator 30, a voltage of 0.4-multiple amount to a mean level is made by a combination of the resistor $R_{32}$ and the variable resistor $VR_{32}$, and it is applied to the two-pole switch $SW_{33}$ through the analog switch $SW_{32}$, in which when the second control signal $S_{5-2}$ is logic high level, the analog switch $SW_{32}$ turns on to provide the adder 40 with the subtracting voltage. However, when both the first and second control signals ($S_{5-1}$, $S_{5-2}$) are logic low level, the analog switches turn off to provide no output voltage. That is, the adding or subtracting voltage is zero.

The two-pole switch $SW_{33}$ is controlled by the time control signal $S_7$ from the inverter $U_{60}$. Thus, when the signal $S_7$ is logic low level, the switch $SW_{33}$ is connected to a ground potential, while when the signals is logic high level, the switch $SW_{33}$ is connected to the adding or subtracting voltage through one of the analog switches ($SW_{31}$, $SW_{32}$), to produce an output signal $S_6$. The time control signal $S_7$ is an inverted signal of the clock signal $S_0$.

And, in the meantime, since the object data signal $S_3$ delayed by three bits is an unipolar signal, it is converted to a bipolar signal by the unipolar-to-bipolar converter 50 having a conventional comparator $U_{51}$ and two voltage-dividing resistors ($R_{51}$, $R_{52}$). The comparator $U_{51}$ compares the unipolar signal $S_3$ with a reference voltage to produce the bipolar signal $S_4$, of which a reference level is zero voltage, according to the logic state of the object data signal $S_3$.

The bipolar data signal $S_4$ is applied to a negative input of an operational amplifier $U_{41}$ of the adder 40, in which the bipolar data signal is added to the adding-/subtracting voltage $S_6$ from the two-pole switch $SW_{33}$. The output of the adder $U_{41}$ is applied to another buffer $U_{42}$ to convert its polarity, which is inversely converted by way of inverting mode operation of $U_{41}$. The output of the adder 40 is applied to the filter 70. This adder 40 includes operational amplifiers $U_{41}$, $U_{42}$ and three bias resistors $R_{41}$, $R_{42}$ and $R_{43}$.

Thus, if the adding/subtracting voltage $S_6$ is a 0.4-multiple increment voltage, then the output $S_8$ of the adder 40 is 1.4 times as high as a mean level, while the voltage $S_6$ is a 0.4-multiple amplitude to the mean level. In addition, when the voltage $S_6$ is zero potential, just the mean level is provided without any modification.

Figure 7:
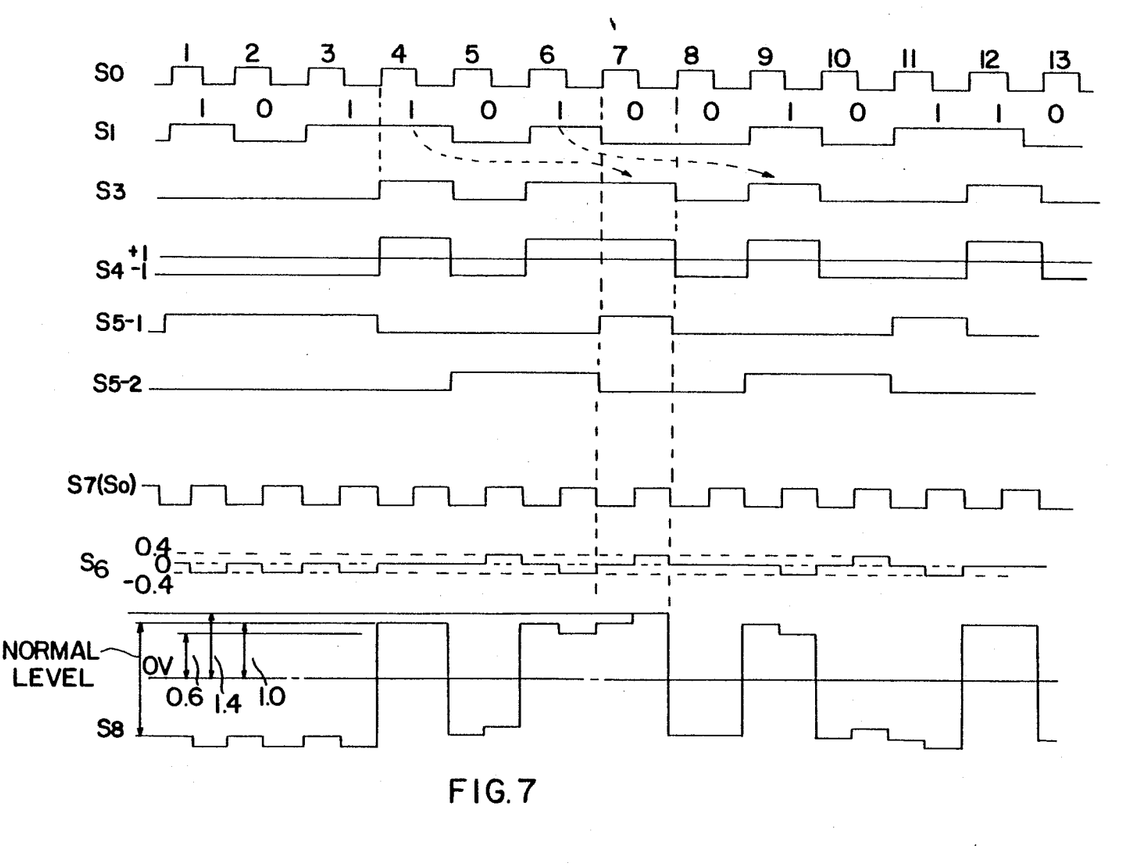
FIG. 7 shows waveforms of every aspect of operation in the FIG. 6 circuit.

Referring to waveforms of FIG. 7 along with the above described operation, the logic level of the random digital data signal $S_1$ in its fourth clock timing period is high. Since this logic high signal is delayed by three bits, the object data signal $S_3$ according to the original random digital data signal $S_1$ of logic high level is outputted at the seventh clock period. This object data signal is converted to a bipolar data signal $S_4$ of FIG. 7, in the unipolar-to-bipolar converter 50.

The delaying circuit outputs the delayed data "011010" in sequence of A, B, C, D, E and F from the fourth bit and following three bits. Thus, the digital symbol of a sequence "C" is the object data signal $S_3$. Referring to the table [1] of FIG. 8, the correction value Vx of this data pattern is 1.4 and thereby, the first control signal $S_{5-1}$ is logic high level. However, since the two-pole switch $SW_{33}$ turns off during a first half period of the clock signal, the adding/subtracting voltage $S_6$ of the voltage generator 30 is zero, thereby outputting a mean level of composite output $S_8$ through the filter 70. Thereafter, since the two-pole switch turns on during the second half period of the clock signal, the 0.4-multiple of adding voltage is applied to the adder 40. The adder 40 mixes the bipolar data signal $S_4$ and the 0.4-multiple adding voltage to make a resultant composite equalization output $S_8$ higher in amplitude than a normal output voltage level by the 0.4-multiple amount. The time control signal $S_7$ from the inverter $U_{60}$ controls on/off operation of the two-pole switch $SW_{33}$.

For another example, a random digital data $S_1$ at the sixth clock period is logic high. This signal is delayed by three bits to produce an object data signal $S_3$, which at the ninth clock period, corresponds to the original data signal $S_1$. Then, the delayed object data signal $S_3$ is converted to a bipolar data signal $S_4$ of FIG. 7, in the unipolar-to-bipolar converter 50. The sixth bit and its preceding two bits and following three bits become "101001" in sequence of A, B, C, D, E and F, by delaying in the delaying circuit 10. The digital symbol of a sequence "C" is the object data signal $S_3$. Thus, referring to the table [1], the correction value Vx of this data pattern is 0.6 and thereby, the second control signal $S_{5-2}$ is logic high level. However, since the two-pole switch $SW_{33}$ turns off during the first half period of the clock signal, the adding/subtracting voltage $S_6$ of the voltage generator 30 is zero, thereby outputting a mean level of composite output $S_8$ from the filter 70. Then, since the two-pole switch turns on during the second half period of the clock signal, the 0.4-multiple of subtracting voltage is applied to the adder 40. Therefore, the adder 40 supplies to the filter a composite signal $S_8$ equalized in amplitude by the 0.6-multiple amount of the normal voltage.

As will be apparent from the aforementioned description, the jitter equalizer according to the invention may achieve the minimal jitter distortion, that is, the minimal phase vibration error in known filter for digital transmission. This will enable obtaining precise time-to-phase information and achieving good performance in spite of simple circuit construction. Furthermore, since the jitter equalizer according to the invention operates with a basic clock synchronized with input digital data, independently of any change of bit rate of the input data, no change or modification of its circuit construction will be necessary. Also, the invention performs digital equalization of jitter and uses digital components in its circuit construction, so that it has less sensitivity to influence of temperature and other environmental factors and has more flexibility in design and production. Moreover, as the jitter equalizer according to the invention may be additionally installed before a known filter, even a slight change or modification of circuit construction in the filter is unnecessary.

Although the invention has been described with a certain degree of particularity, it is understood that the present disclosure has been made only by way of example and that numerous changes in the details of construction, the method of operation, and the combination and arrangement of parts may be made without departing from the spirit and scope of the invention as hereinafter claimed.

What is claimed is:

1. An equalizer for equalizing jitter, overshoot and undershoot in the amplitude of a transmission signal input for a digital transmission filter, comprising:

delay means having a plurality of delay elements, for synchronizing a random non-return-to-zero (NRZ) input data signal input thereto with a basic clock signal input thereto to produce a delayed input data signal which is delayed by a predetermined number of data bits, and for outputting a plurality of data bits of a data stream, each of said data bits respectively corresponding to one of said plurality of delay elements;

logic circuit means coupled with outputs of said delay means and receiving said output data stream therefrom, for producing a plurality of control voltage signals corresponding to patterns of logic symbols of said input data signal from said plurality of bits of said data stream, said plurality of voltage control signals designating information as to how much said delayed input data signal will be distorted by data signals adjacent thereto upon passing through a digital transmission filter;

adding and subtracting voltage generator means coupled to an output of said logic circuit means, for outputting a given level of an adding or subtracting voltage in response to said plurality of voltage control signals from said logic circuit means under the control of a time control signal applied thereto;

unipolar-to-bipolar converter means coupled to said delay means, for converting said delayed input data signal from a unipolar input data signal to a bipolar input data signal; and adder means coupled to respective outputs of said unipolar-to-bipolar converter means and said adding and subtracting voltage generator means, for adding said bipolar input data signal to said given level of adding or subtracting voltage, the added output of said adder means compensating for an amount of signal distortion which will arise in an output waveform of a digital transmission filter due to the influence of pulse tails of data signals adjacent to said input data signal when said bipolar input data signal passes through said filter.

2. An equalizer according to claim 1, further comprised of:

means for generating a time control signal coupled between an input for said basic clock signal and said adding and subtracting voltage generator means.

3. An equalizer according to claim 2, wherein said means for generating a time control signal comprises at least one logic inverter receiving said basic clock signal and providing said adding and subtracting voltage generator means with said time control signal at an output of the logic inverter.

4. An equalizer according to claim 1, wherein said delay means comprises said plurality delay elements coupled in cascade connection with each other for synchronizing said random NRZ input data signal with said basic clock signal so that said input data signal is delayed by a given number of bits.

5. An equalizer according to claim 4, wherein said each delay element is at least one D flip-flop.

6. An equalizer according to claim 4, wherein said logic circuit means comprises a plurality of pairs of an inverter and a NAND gate, each said pair of an inverter and a NAND gate corresponding to a respective output of a delay element of said delay means, for producing said plurality of voltage control signals according to the pattern of logic symbols of said input data signal.

7. An equalizer according to claim 6, wherein said plurality of voltage control signals have at least two states designating, respectively, an adding voltage and a subtracting voltage.

8. An equalizer according to claim 6, wherein said adding and subtracting voltage generator means comprises at least two switches operating in response to logic states of said voltage control signals, whereby either one of said adding or subtracting voltage is generated according to on and off states of said switches.

9. An equalizer according to claim 8, wherein said adding and subtracting voltage generator means is further comprised of at least one two-pole switch operating in response to a logic state of said time control signal, said two-pole switch being operably connected between said at least two switches of said adding and subtracting voltage generator means and said adder means.

10. An equalizer according to claim 8, wherein said at least two switches are analog switches of tri-state type.

11. An equalizer according to claim 8, wherein said unipolar to bipolar converter means comprises at least one comparator for comparing said delayed input data signal with a reference voltage.

12. An equalizer according to claim 11, wherein said adder means comprises at least one operational amplifier means for adding the output of said unipolar-to-bipolar converter means and the output of said adding and subtracting voltage generator means, and a plurality of bias resistors.

13. A method for equalizing jitter, overshoot and undershoot phenomena in a digital transmission filter, comprising the steps of:

making a pre-estimate as to the extend of signal distortion which will be caused by the sum of pulse tails in pulse waveforms data patterns adjacent data an input data signal during passage of said input data signal through a digital transmission filter, according to logic states of said adjacent data patterns;

on the basis of said pre-estimate, equalizing said input data signal, prior to passing through said filter, with a higher amplitude of an output square wave than a mean level of said sum of said pulse tails, when said sum of said pulse tails increases in a negative direction; and on the basis of said pre-estimate, equalizing said input data signal, prior to passing through said filter, with a lower amplitude of an output square wave than the mean level of said sum of said pulse tails, when said sum of said pulse tails increases in a positive direction.

14. A method according to claim 13, wherein in said steps of equalizing said input data signal, the equalization is performed by modifying only a second half period of an output square wave of said input data signal.

* * * * *

UNITED STATES PATENT AND TRADEMARK OFFICE
CERTIFICATE OF CORRECTION

PATENT NO. : 5,058,130

DATED : 15 October 1991

INVENTOR(S) : Il Kun PARK

It is certified that error appears in the above-identified patent and that said Letters Patent is hereby corrected as shown below:

Column 3,    Line 29,    delete "a", and insert --a-- before "data";

Column 4,    Line 16,    delete "of", and insert --of-- after "diagram";

Line 19,    delete "of", and change "on" to --of an--;

Line 45,    delete "of", and insert --of-- after "diagram";

Column 5,    Line 55,    change "signal data" to --data signal--;

Column 9,    Line 14,    change "of" (third occurrence) to --there--;

Column 11,   Line 27,    delete the comma;

Line 52,    insert --a-- after "in";

UNITED STATES PATENT AND TRADEMARK OFFICE
CERTIFICATE OF CORRECTION

PATENT NO. : 5,058,130

DATED : October 15, 1991

INVENTOR(S) : Il Kun Park

It is certified that error appears in the above-identified patent and that said Letters Patent is hereby corrected as shown below:

Column 14, line 12, (claim 13), change "extend" to --extent--.

Signed and Sealed this

Ninth Day of March, 1993

*Attest:*

STEPHEN G. KUNIN

*Attesting Officer*   *Acting Commissioner of Patents and Trademarks*